C. E. BROOKS.
TRACTOR.
APPLICATION FILED DEC. 13, 1920.

1,433,257.

Patented Oct. 24, 1922.
3 SHEETS—SHEET 1.

INVENTOR.
CHARLES E. BROOKS,
by Rippey & Kingsland
HIS ATTORNEYS.

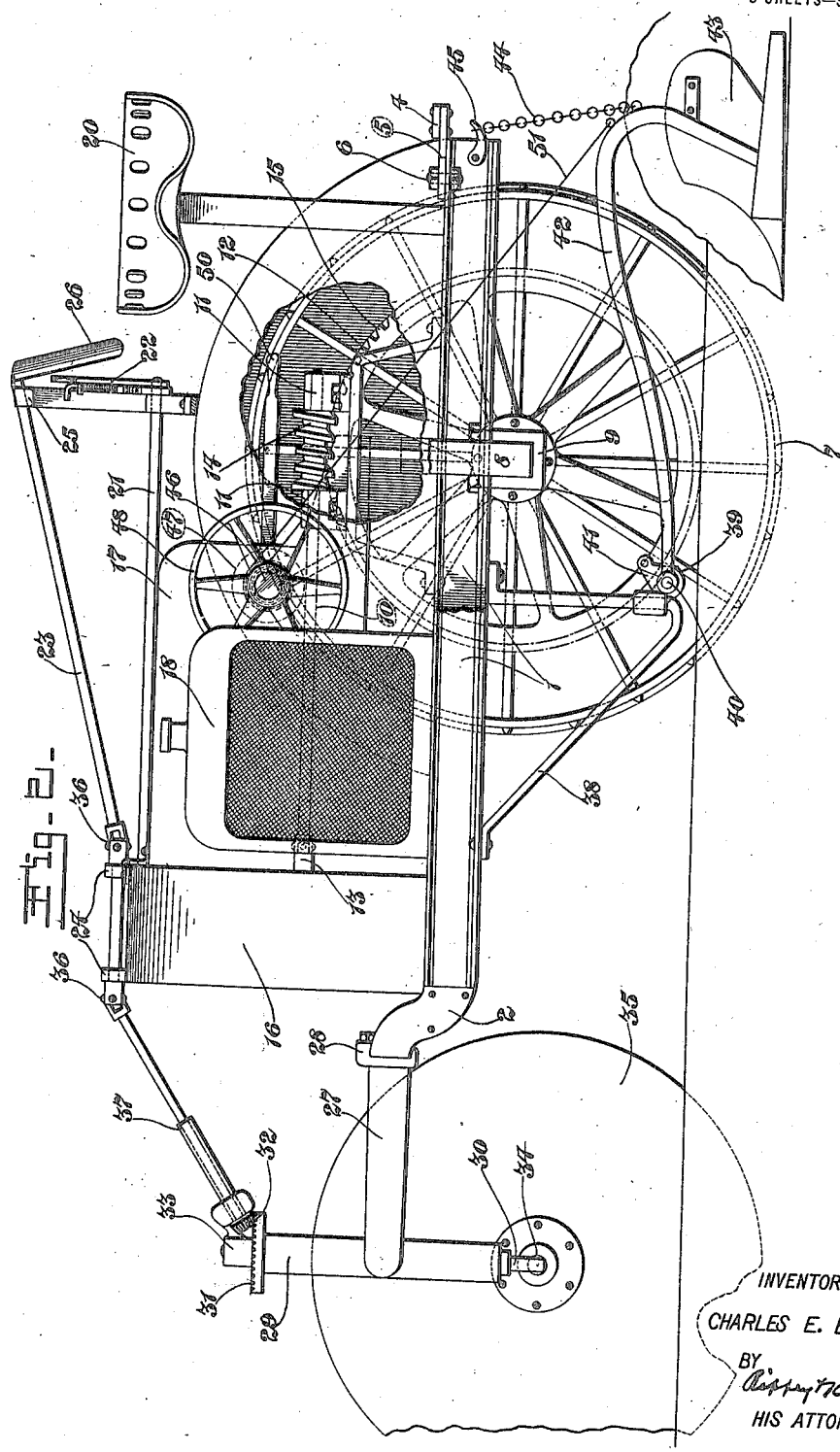

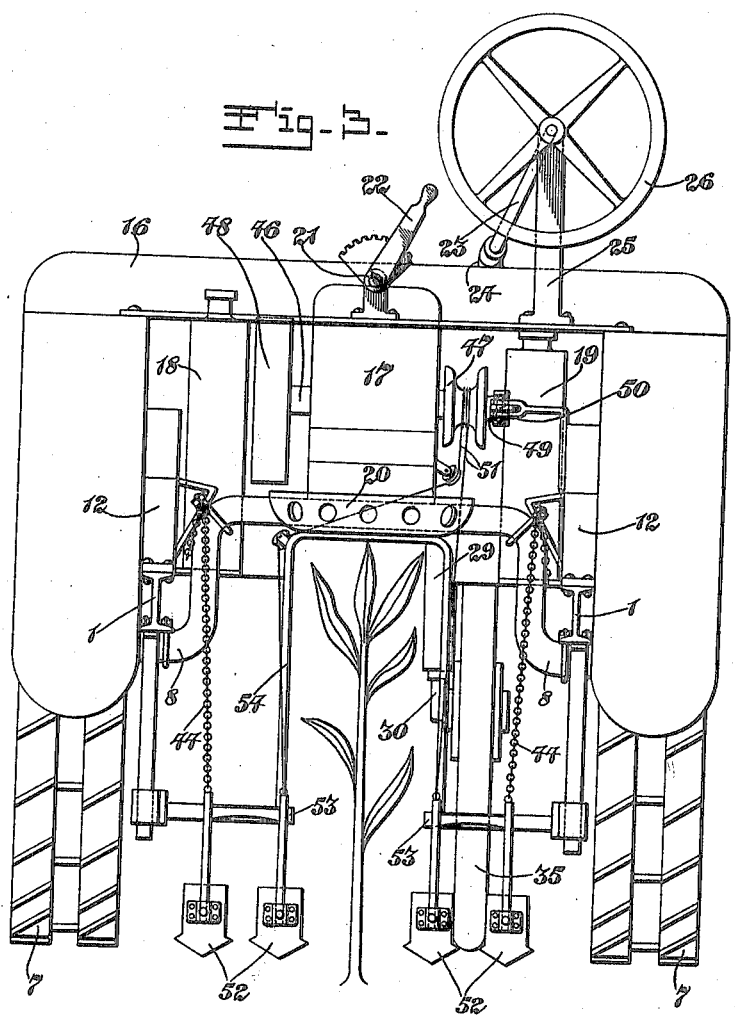

Patented Oct. 24, 1922.

1,433,257

UNITED STATES PATENT OFFICE.

CHARLES E. BROOKS, OF ST. LOUIS, MISSOURI.

TRACTOR.

Application filed December 13, 1920. Serial No. 430,181.

*To all whom it may concern:*

Be it known that I, CHARLES E. BROOKS, a citizen of the United States, residing in the county of St. Louis and State of Missouri, have invented a new and useful Tractor, of which the following is a specification.

This invention relates to improvements in tractors, and consists in the novel construction hereinafter disclosed.

An object of the invention is to provide a light tractor designed so that the agricultural implements may be attached directly thereto and readily interchanged.

Another object of the invention is to provide a three wheel tractor wherein the front wheel is adjustable laterally of the frame.

Another object of the invention is to incorporate in a tractor novel means for supporting the agricultural implements.

Another object of the invention is to generally simplify and to produce in a compact form an efficient tractor adapted for general farm work.

Additional advantages will be apparent from the following detailed description taken in connection with the accompanying drawings, in which Fig. 1 is a plan view.

Fig. 2 is a side elevation with portions broken away to better illustrate the construction, showing a plow attached to the tractor.

Fig. 3 is a rear elevation of the tractor showing a cultivator attached thereto.

Figure 1:
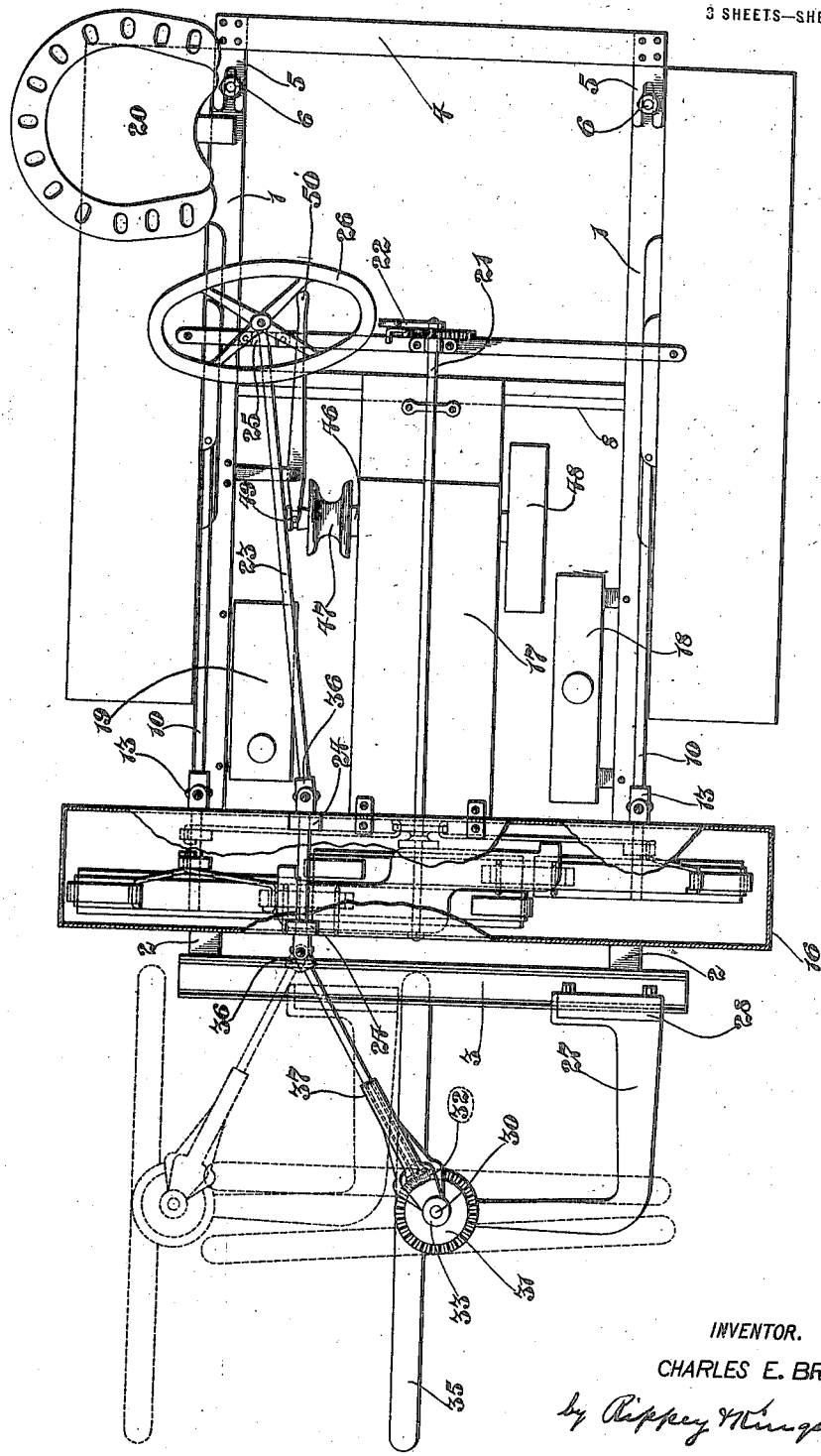

In the embodiment of the invention illustrated in the drawings the frame of the tractor is made up of side members 1 having an upwardly extending bracket 2 at the forward end of each of the side members and a transverse front member 3 supported by the brackets 2. The side and front members 1 and 3 are preferably made of I-beams so that they will be strong and at the same time relatively light. The back of the frame is composed of a cross member 4 having slotted extensions 5 so that it may be adjustably connected by bolts 6 with the side members. The cross member 4 is made so that it may be readily removed when the tractor has attached thereto a cultivator or other implement, where it is necessary to have a free clearance space through the center of the tractor to avoid the rows of corn or other field products.

The tractor wheels 1 are mounted exteriorly of the frame on an axle 8, the axle 8 extending transversely of the frame and being supported in brackets 9 underslung with respect to the side members of the frame and bolted thereto. The central portion of the axle is arched so that it rises above the frame intermediate the side members, giving ample clearance for the tractor to pass over rows of corn, or other field products planted in rows without contacting therewith, as will clearly appear from Fig. 3. The ends of the axle receive the hubs of the tractor wheels so that the wheels revolve, and the axle is stationary. Each of the tractor wheels has an independent drive connection comprising a drive shaft 10 journaled at its rearward end in a journal box 11 supported by a bracket 12 bolted to the top face of the side members 1. The drive shafts 10 have universal connections 13 at their forward ends coupling them with separate members of a transmission mechanism, the details of which are not made a part of this invention except generally, the transmission mechanism being designed so that the independent drive shafts for the tractor wheels may be rotated independently in the same direction, in reverse, or in either direction.

The driving connection between the respective shaft 10 and its associated tractor wheel, includes a worm gear 14 that meshes with a gear 15 rigidly connected with the tractor wheel and disposed intermediate the outer side of the frame and the inner face of the wheel.

The transmission mechanism is driven from an engine supported in the frame of the machine, the bottom of the engine being elevated somewhat above the top of the frame so as to provide under clearance for the tractor. The transmission mechanism is arranged transversely of the front end of the frame and is enclosed within a case 16, and a hood 17 is arranged to cover the engine.

In carrying out the compact construction of the tractor it is preferred that the radiator 18 be supported at one side of the frame and the fuel tank 19 at the opposite side of the frame.

The tractor is designed to be driven by an operator carried by a supporting seat 20, which seat is near the rear end of the frame, all of the controlling mechanism and the steering wheel being located adjacent to the seat. The controlling rod 21, with its controlling lever 22, extends backwardly through the frame of the machine and terminates for convenient manipulation from the driver's seat 20. The steering column 23 is supported in brackets 24 and 25 in an inclined position at the side of the machine adjacent to the driver's seat, a steering wheel 26 being attached to the steering column in convenient location with respect to the driver's seat.

The front wheel of the tractor is designed for lateral adjustment across the frame of the machine so that the front wheel may be moved from the center of the tractor to one side when the tractor is used in the field, so as to avoid the rows of corn or other field products planted in rows. Provision for the lateral adjustment of the front wheel equips the tractor so that it may be efficiently used for different cultivating purposes. When it is desired to have a clearance at the center of the tractor such, for instance, as in cultivating field products in rows, the wheel may be set over to one side so that it tracks with the tractor wheel, leaving the center of the tractor clear so that it will pass over the rows. In certain other operations it is an advantage to have the wheel in the center of the tractor. Inasmuch as the construction permits the easy adjustment of the front wheel the changes may be made as required by the different uses of the tractor.

The support for the wheel comprises an angle bracket 27 having an extension 28 that fits over and slides upon the cross member 3, the extension 28 being designed for clamping engagement with respect to the member 3. The opposite end of the bracket 27 supports a tubular member 29 in which is mounted the shank 30 of the front wheel axle. The shank 30 of the front wheel axle carries a gear wheel 31 at its upper end, which meshes with a bevel gear 32 carried at the end of the steering column. A bracket 33 attached to the member 29 constitutes a support for the end of the steering column and for positioning the gear 32 so that it will mesh with the gear 31. The axle 34 for the front wheel 35 extends at right angles to the lower end of the shank 30, so that as the shank is revolved the wheel will be turned to selected positions for guiding the tractor.

The mounting and steering mechanism for the front wheel is so designed that the front wheel has a radius of movement of approximately 180 degrees, in order that it may be turned in either direction at right angles from the straight away to either side. This movement of the wheel is indicated in dotted lines in Fig. 1 and provides for the turning of the tractor within a small area. In turning the tractor the front wheel may be adjusted and one of the tractor wheels operated in forward direction and the other tractor wheel in a reverse direction, that is the tractor wheel away from the direction of turn actuates the tractor forward and the tractor wheel on the side in the direction of the turn moves the tractor rearwardly. It will thus be seen that the tractor may be turned practically upon a pivot of which the tractor axle is the center.

In order that the steering column may be moved and extended to conform with the different adjustment of the front wheel the support for the steering column is made in three sections connected by universal joint connections 36, and the end thereof is provided with an extendible telescoping section 37.

Inasmuch as the specific construction of the front wheel support is not made a part of this invention and as, obviously, the details may be modified to accomplish the same general result, it is unnecessary herein to more particularly describe the construction. As an element of the tractor the adjustability of the front wheel support as well as adapting it to be controlled from different lateral positions is broadly a part of the invention of this application, it not being sought to cover herein the specific details of the construction.

The tractor is designed to have directly attached thereto agricultural implements of different characters and for the purpose of illustration there is shown connected therewith (Fig. 2) a plow and in Fig. 3 a cultivator. The implement support comprises brackets 38 supported beneath each of the side members 1, the brackets being bolted thereto. The brackets carry hook-shaped supports 39 adapted to receive cross bars 40. The supports 39 are equipped with latch pawls 41 so that the cross bars are seated in the supports and the latch pawls positioned to prevent the cross bars from lifting out of their seats.

In the embodiment shown in Fig. 2 the tractor is equipped with a plow which includes the plow beam 42 that carries a plow 43 at its outer end. Inasmuch as the cross beam 40 is free to move in its supports 39, or in other words, the cross bar being pivotally connected with the brackets 38, the plow beam may be raised and lowered and held in selected vertical adjustments by a chain 44 attached to the plow beam and engaged with a hook 45 carried by either one or both of the side members 1.

The provision for supporting the plow beam near the end thereof, away from the pivot point, furnishes a means whereby the plow is prevented from depressing into the soil, or, in other words, the plow blade is held at a constant level so that there is a straight pull forward on the plow beam. This suspension construction permits the operation of the plow with a minimum of power.

In the embodiment of the invention shown in Fig. 3, the tractor is illustrated as equipped with a cultivator. The cultivator shovels 52 are supported in a frame 53, the frame being connected with the brackets 39 similarly to the manner in which the plow is connected. The rear of the cultivator frame is supported by the chains 44 attached at one end to the frame of the tractor and at the other end to said cultivator frame. The cultivator frame has an arched member 54 so that it may pass over the rows of field products. When the cultivator attachment is used the seat 20 may be supported on this arched central member 54 of the cultivator frame.

The tractor is equipped with a power device which may be utilized as a winding drum for raising and lowering the agricultural implements, or as a power pulley for driving mechanisms from the tractor. For this purpose an independent power shaft 46 is supported transversely of the frame and is connected in any suitable manner with the engine of the tractor. In the embodiment shown the power shaft 46 is equipped with a drum 47 and a power pulley 48 and may be provided with other suitable power transmission connection. The shaft 46 may be controlled by a clutch device 49 manipulated by a lever 50 conveniently positioned with respect to the driver's seat.

In Fig. 2 of the drawing I have illustrated the manner in which the plow beam may be raised by the mechanism just described, that is to say a flexible connection 51 is attached at one end to the plow beam and at the other end is wound on the drum 47.

In Fig. 3 of the drawing I have illustrated the manner in which the cultivator frame may be raised and lowered. In this case I provide two flexible connections 51 attached at one end to the cultivator frame and at the other end wound around the drum. Thus the frame may be easily elevated by the power device. It is obvious that other power driven apparatus may be associated with the tractor such, for instance, as a saw, the same being driven from the power pulley 48.

I am aware that the invention may be modified in certain details without departing from the spirit and scope thereof. What I claim and desire to secure by Letters Patent, is:—

1. In a tractor, the combination of frame side members, a supporting axle intermediate of the ends of said side members, a pair of tractor wheels journaled for rotation on the ends of said axle, a cross member at the front ends of said side members, a bracket supported for lateral sliding movements on said cross member, a single front wheel rotatable on said bracket, and a device for clamping said bracket in different laterally adjusted positions on the cross member to maintain said front wheel in line with one of the tractor wheels, or in line with the longitudinal axis of the tractor, or in any other position intermediate of said positions.

2. In a tractor, the combination of frame side members, a supporting axle intermediate of the ends of the side members, a pair of tractor wheels journaled for independent rotation on the axle, a cross member connecting the forward ends of the side members, a bracket supported for lateral sliding movements on said cross member, an element mounted for turning movements in said bracket, a front wheel rotatable on said element, a device for clamping said bracket in different laterally adjusted positions on said cross member to maintain said front wheel in line with one of the tractor wheels or in line with the longitudinal axis of the tractor or in any other position intermediate of said positions, steering mechanism for controlling said front wheel in any position in which it may be maintained, and driving mechanism for driving said tractor wheels independently of each other to propel the tractor and to enable the front wheel to control the direction of travel.

3. In a tractor, the combination of a frame, comprising side members, and a transverse front member connecting the ends of the side members; an axle secured to the side members for supporting the frame; a pair of tractor wheels journaled for independent rotation on the axle; a bracket supported for lateral sliding movements on said cross member for the single front wheel of the tractor; a vertical element mounted for turning movements in said bracket; a front wheel rotatably connected with the lower end of said element; a device for clamping said bracket in different laterally adjusted positions on the cross member to maintain said front wheel in line with one of the tractor wheels or in line with the longitudinal axis of the tractor or in any other position intermediate of said positions; a part extending laterally from the upper forward portion of said bracket; a steering column supported for rotation above the frame; and an extendible and contractible connection from the steering column having its forward end supported by said laterally extended part, for controlling the direction of travel of said front wheel in any position thereof.

4. In a tractor, the combination of a frame comprising side members, and a transverse front member connecting the forward ends of the side members, an axle secured to the side members for supporting the frame; a pair of tractor wheels journaled for independent rotation on the axle; a bracket supported for lateral sliding movements on said transverse member for the single front wheel of the tractor; a tubular part rigid with the forward end of said bracket; an element mounted for turning movements in said tubular part; a single front wheel rotatably connected with the lower end of said element, a device for clamping said bracket in different laterally adjusted positions on the front member of the frame to maintain said front wheel in line with one of the tractor wheels or in line with the longitudinal axis of the tractor or in any other position intermediate of said positions; a laterally extended bracket rigid with the upper end of said tubular part; a steering column mounted for rotation above the frame; an extendible and contractible connection from the steering column having its forward end supported by said laterally extended bracket for controlling said front wheel in any position thereof; mechanism for rotating said tractor wheels independently of each other to propel the tractor and to enable the front wheel to control the direction of travel; ground working mechanism connected with the frame; and a connection for controlling vertical movements of the ground working mechanism.

5. In a tractor, a frame, tractor wheels supporting the rear end of the frame; a bracket for supporting the forward end of the frame; a device for holding said bracket in different laterally adjusted positions at the forward end of the frame to maintain the front wheel in line with one of the tractor wheels or in line with the longitudinal axis of the tractor or in any other position intermediate of said positions; a front wheel rotatably connected with said bracket; a part rotatable in the bracket for turning the front wheel in different directions of travel; a gear rigid with the upper end of said part; a sleeve rotatably supported at the upper end of said bracket; a pinion on said sleeve meshing with said gear; an element telescoping within said sleeve; a steering column; a part connecting the steering column with said element; and brackets in which said last-named part is supported.

CHARLES E. BROOKS.